United States Patent
Uchida

(10) Patent No.: US 6,554,313 B2
(45) Date of Patent: Apr. 29, 2003

(54) AIR BAG SYSTEM

(76) Inventor: Toshiki Uchida, 15-21-201, Ihkura 5-chome, Sawara-ku, Fukuoka-shi, Fukuoka-ken (JP)

( * ) Notice: Subject to any disclaimer, the term of this patent is extended or adjusted under 35 U.S.C. 154(b) by 62 days.

(21) Appl. No.: 09/785,151

(22) Filed: Feb. 16, 2001

(65) Prior Publication Data

US 2002/0113416 A1 Aug. 22, 2002

(51) Int. Cl.7 ............................................. B60R 21/24
(52) U.S. Cl. ..................................... 280/729; 280/739
(58) Field of Search .......................... 280/729, 739, 280/740, 742, 743.1

(56) References Cited

U.S. PATENT DOCUMENTS

| | | | | |
|---|---|---|---|---|
| 3,907,327 A | * | 9/1975 | Pech | 280/729 |
| 5,240,283 A | * | 8/1993 | Kishi et al. | 280/729 |
| 5,249,824 A | * | 10/1993 | Swann et al. | 280/729 |
| 5,478,111 A | * | 12/1995 | Marchant et al. | 280/739 |
| 5,560,649 A | * | 10/1996 | Saderholm et al. | 280/739 |
| 5,704,639 A | * | 1/1998 | Cundill et al. | 280/739 |
| 5,732,973 A | * | 3/1998 | Turnbull et al. | 280/730.1 |
| 5,906,391 A | * | 5/1999 | Weir et al. | 280/729 |
| 5,924,721 A | * | 7/1999 | Nakamura et al. | 280/730.2 |
| 5,927,748 A | * | 7/1999 | O'Driscoll | 280/729 |
| 5,957,485 A | * | 9/1999 | Haria | 280/729 |
| 5,997,035 A | * | 12/1999 | Harai | 280/743.1 |
| 6,059,310 A | * | 5/2000 | Buss | 280/729 |
| 6,059,312 A | * | 5/2000 | Staub et al. | 280/729 |
| 6,183,009 B1 | * | 2/2001 | Rychter et al. | 280/743.1 |
| 6,224,101 B1 | * | 5/2001 | Nishijima et al. | 280/743.2 |
| 6,254,121 B1 | * | 7/2001 | Fowler et al. | 280/729 |
| 6,260,877 B1 | * | 7/2001 | Rasmussen et al. | 280/729 |
| 6,290,257 B1 | * | 9/2001 | Bunce et al. | 280/739 |
| 6,419,267 B1 | * | 7/2002 | Hashimoto et al. | 280/743.1 |

FOREIGN PATENT DOCUMENTS

| | | |
|---|---|---|
| JP | 2-310143 | 12/1990 |
| JP | 3-281460 | 12/1991 |

* cited by examiner

Primary Examiner—Brian L. Johnson
Assistant Examiner—Christopher Bottorff
(74) Attorney, Agent, or Firm—Jordan and Hamburg LLP

(57) ABSTRACT

Provided is a safer air bag system which relieves shock to the head and face of an occupant when an air bag inflates and deploys. An air bag body 1 consists of a primary air bag 2 and a secondary air bag 3 which is provided on the front surface of the primary air bag 2. When an inflator 4 is actuated, the high-pressure gas is introduced into the primary air bag 2 to inflate and deploy the primary air bag 2 and then fed into the secondary air bag 3 through gas introducing ports 6 of the primary air bag 2 so that the secondary air bag 3 inflates and deploys more slowly than the primary air bag 2. The secondary air bag 3 thus absorbs shock to the face of the occupant caused by the inflation and deployment of the primary air bag 2.

6 Claims, 3 Drawing Sheets

AIR BAG SYSTEM

BACKGROUND OF THE INVENTION

1. Field of the Invention

The present invention relates to an air bag system for protecting occupants from impact during a car accident.

2. Description of the Related Art

Recently, in order to secure occupants' safety in such vehicular collisions as car accidents, more vehicles tend to be equipped with air bag systems in which, when collision occurs, an air bag inflates and deploys within the vehicle to restrain an occupant. In air bag systems, upon collision of automobiles or the like, a sensor is switched by the impact of the collision to actuate an inflator which ejects a high-pressure gas at a high temperature. The gas instantaneously inflates an air bag to protect the occupant's face, front of the head and chest.

In the above conventional air bag systems, the air bag is deployed by a sharp pressure rise by the inflator and rapidly inflates and deploys upward/downward and in the right and left directions as well as toward the occupant. Thus, the air bag itself needs strength to such an extent that the air bag is resistant to the sudden increase in the inner pressure caused by the high-pressure gas and the impact against the occupants. Therefore, the air bag is made of a tough material.

However, the above structure of the air bag system has caused secondary injuries to occupants. Specifically, such secondary injuries were attributed to an impact to the head, face and upper body of the occupants against the surfaces of the air bags made of tough materials which rapidly inflate and deploy by the high-pressure gas. This has caused various injuries to occupants such as facial burns, nasal bone fractures, corneal damage, which particularly occurs in senior occupants who have deteriorated reflexes in sudden accidents, cervical vertebral damage and fractures, which often occur in infants who sit in inappropriate postures.

Particularly in Western countries, air bag systems are designed so that the air bags themselves can sufficiently absorb shock by a collision without the use of seat belts as well. Therefore, both pressure and amount of the gas fed into the air bags are set much higher than those in the case where air bags are used as auxiliary restraining devices to seat belts. Accordingly, secondary injuries to the occupants are considerably worse, sometimes causing death, which leads to social problems.

Coping with the above problems of conventional air bag systems, the air bags with less shock upon inflation and deployment are disclosed in Unexamined Japanese Patent Publications Nos. H2-310143 and H3-281460 as well as in U.S. Pat. No. 5,927,748.

The air bag system disclosed in Unexamined Japanese Patent Publication No. H2-310143 is provided with a low-pressure inflator and a high-pressure inflator as the inflators for inflating and deploying the air bag. By a delaying means, when a vehicle collides, the low-pressure inflator is first ignited and actuated, followed by the ignition and actuation of the high-pressure inflator. Thus, in the initial period of restraining an occupant, the inflation and deployment of the air bag under the low pressure lessens the sudden shock or impact to the occupant. Next, the ignition and actuation of the high-pressure inflator raise the inner pressure of the air bag to securely restrain and adequately protect the occupant. In this air bag system, however, the different kinds of inflators, that is, the low-pressure and high-pressure inflators provided in the system complicate the system and also increase costs.

The air bag system disclosed in Unexamined Japanese Publication No. H3-281460 has a double-layered structure comprising an inner bag of smaller capacity and an outer bag of larger capacity, the inner bag being housed within the outer bag, wherein a plurality of gas ports each having an opening of a particularly large dimension are provided only on an outer periphery of the inner bag. In this structure, an inflator actuated at the time of collision introduces a high-pressure gas into the inner bag to inflate and deploy the inner bag at an initial stage, and then the gas is fed through the gas ports provided on the outer periphery of the inner bag into the outer bag to fully inflate and deploy the outer bag upward/downward and in the right and left directions.

The air bag system disclosed in U.S. Pat. No. 5,927,748, similar to the air bag system of Unexamined Japanese Publication No. H3-281460, has also a double-layered structure comprising a primary inflatable bag and a secondary inflatable bag, the primary bag being housed within the secondary bag.

In the above-described double-layered air bag systems, merely the timing when the outer or secondary bag starts to inflate and deploy is delayed by introducing a gas through the inner or primary bag. The pressure caused by the high-pressure gas upon inflation and deployment of the air bag is thus imposed equally in all directions of the outer or secondary bag, wherein relieving the shock or impact toward the face and head of an occupant who touches the outer or secondary bag is not given particular consideration.

Additionally, in the air bag systems disclosed in Unexamined Japanese Publication No. H3-281460 and U.S. Pat. No. 5,927,748, the high-pressure gas which has inflated and deployed the inner or primary air bag is exhausted outside only through the outer or secondary bag. An occupant who collided with the outer or secondary bag may crush the bag to block gas passages between the inner/primary bag and the outer/secondary bag. In this case, the high-pressure gas cannot be easily discharged from the inner or primary bag, thereby making it impossible to relieve the shock or impact to an occupant by reducing the pressure of the inner or primary bag.

SUMMARY OF THE INVENTION

An object of the present invention is to provide a safer air bag system, which lessens the shock or impact to the head and face of an occupant when an air bag inflates and deploys.

An air bag system according to the present invention comprises a primary air bag and a secondary air bag wherein the secondary air bag is provided on the side facing an occupant of the primary air bag. The primary air bag inflates and deploys by a high-pressure gas, and the secondary air bag inflates and deploys by the high-pressure gas introduced through the primary air bag. By this structure, the secondary air bag inflates and deploys more slowly than the primary air bag. The primary air bag absorbs most of the primary impact to an occupant in a vehicular collision such as car accidents while the secondary air bag mainly absorbs the shock or impact to the face caused by inflation and deployment of the primary air bag.

The primary air bag and the secondary air bag can be formed separately wherein the primary air bag and the secondary air bag are connected by a connecting means such as a tube. However, it is preferable that the secondary air bag is formed to adhere to the primary air bag, and at least one gas introducing port which introduces a high-pressure gas into the secondary air bag is provided on the primary air bag on the side facing an occupant. Thus, since the high-pressure gas introduced into the secondary air bag is limited by the gas introducing port, the flow rate of the high-pressure gas introduced into the secondary air bag is less. Consequently, the secondary air bag inflates and deploys more slowly than the primary air bag.

The gas introducing port may have any form; however, it is preferable to provide 10 to 30 round-shaped gas introducing ports having a diameter of 3 mm to 10 mm. When the high-pressure gas passes through the ports, the round shape makes the pressure imposed on the gas introducing port uniform. It may also be preferable to provide 2 to 10 gas introducing ports which have larger diameters than the above. In any case, in order that the secondary air bag inflates and deploys more slowly than the primary air bag, the gas introducing port is provided so as to reduce the flow rate of the high-pressure gas introduced into the secondary air bag, thereby relieving shock to the face when the air bag inflates and deploys.

It is also preferable that each of the primary air bag and the secondary air bag is provided with at least one vent hole for exhausting the high-pressure gas when the primary and secondary air bags inflate and deploy. When the secondary air bag inflates and deploys, excessive gas is exhausted from the vent hole provided on the secondary air bag, thereby relieving shock or impact to the face of an occupant. If an occupant collides with the secondary air bag and crushes the secondary air bag to block a passage for introducing the high-pressure gas from the primary air bag into the secondary air bag, the vent hole provided on the primary air bag allows the high-pressure gas to be exhausted so that the shock to the face then caused by the primary air bag is relieved. More number of or larger size of vent holes provided on the secondary air bag compared with the vent holes on the primary air bag make acceleration in an aperiodic motion of the shock by the secondary air bag less than that of the shock by the primary air bag. Accordingly, the shock or impact caused by the secondary air bag to the face is less than the shock by the primary air bag.

The vent hole may have any form; however, it is preferable to provide 2 to 10 round-shaped vent holes having a diameter of 10 mm to 30 mm. When the high-pressure gas passes through the vent hole, the round shape makes the pressure imposed on the vent hole uniform. On the other hand, the vent hole may have a larger diameter which allows most of the high-pressure gas introduced into the secondary air bag to be discharged outside because most of the primary impact is absorbed by the primary air bag and the secondary air bag only needs to absorb 10–30% of the primary impact.

The secondary air bag may be made of a softer material than the material of the primary air bag. Thus, the primary air bag which is made of a standard material maintains the ability to absorb the primary impact while the softness of the secondary air bag due to the material can absorb the impact when the secondary air bag inflates and deploys, thereby relieving the shock to the face.

The primary air bag is manufactured by a process similar to that of conventional air bags. Specifically, in order to improve heat resistance, flame retardance and air tightness, a base sheet is made by applying and layering an elastomer resin such as synthetic rubber including chloroprene rubber, chlorosulfonated olefin, or silicone onto a plain weave fabric made of nylon 66 or nylon 6 filament yarn of 300 to 1000 denier. Then, the base sheet is cut and sewn to make a bag. The secondary air bag is made of a softer material than the above material of the primary air bag, which may be sponge, urethane foam, extensible resin or the like. Among them, urethane foam is most preferable because the use of urethane foam particularly lessens shock to the face. It is also possible to coat a standard material with urethane foam to absorb impact.

The shock to the face when the secondary air bag inflates and deploys can be further lessened by making the secondary air bag thinner than the primary air bag while maintaining the ability to absorb the primary shock by the primary air bag made of a standard material. In this case, even if the primary and secondary air bags are made of the same materials, the same effect as mentioned above can be achieved. Preferably, the secondary air bag has 20–80% thickness of the thickness of the primary air bag. The secondary air bag of less than 20% thickness may tear when inflating and deploying, and the secondary air bag of more than 80% thickness has almost the same impact as the primary air bag.

BRIEF DESCRIPTION OF THE DRAWINGS

FIG. 5 illustrates a process of absorbing an impact according to the embodiment of the present invention wherein

DESCRIPTION OF THE PREFERRED EMBODIMENT

Figure 1:
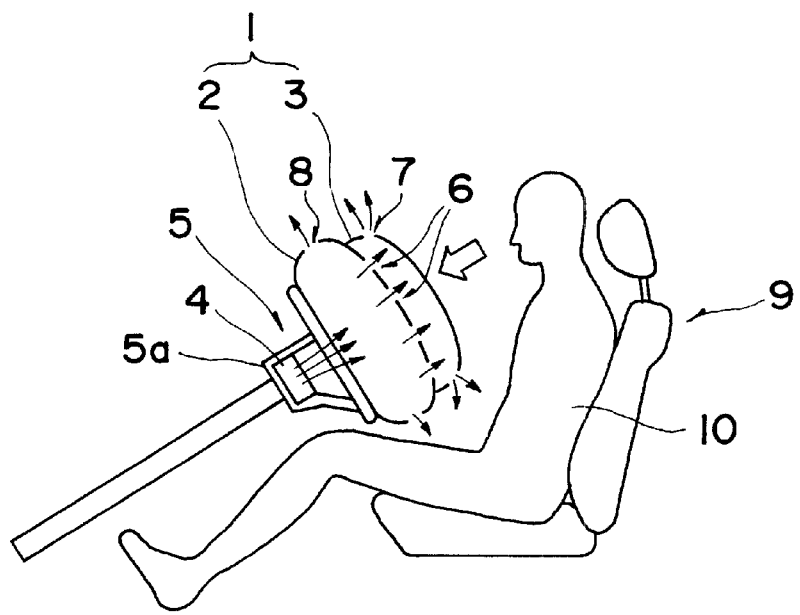
FIG. 1 is a side sectional view showing an air bag system of an embodiment of the present invention when inflating and deploying.
Figure 2:
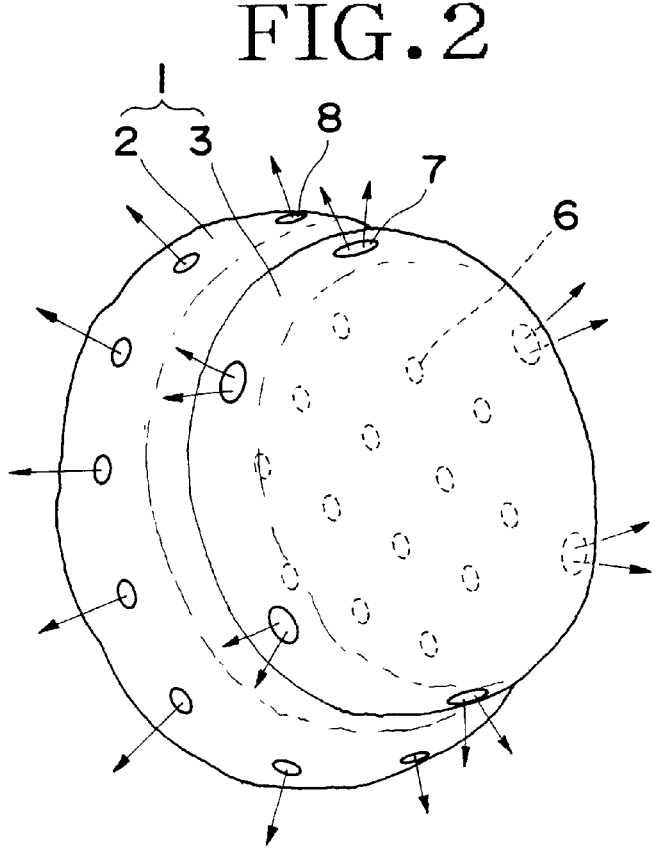
FIG. 2 is a perspective view of the air bag system when inflating and deploying.
Figure 3:
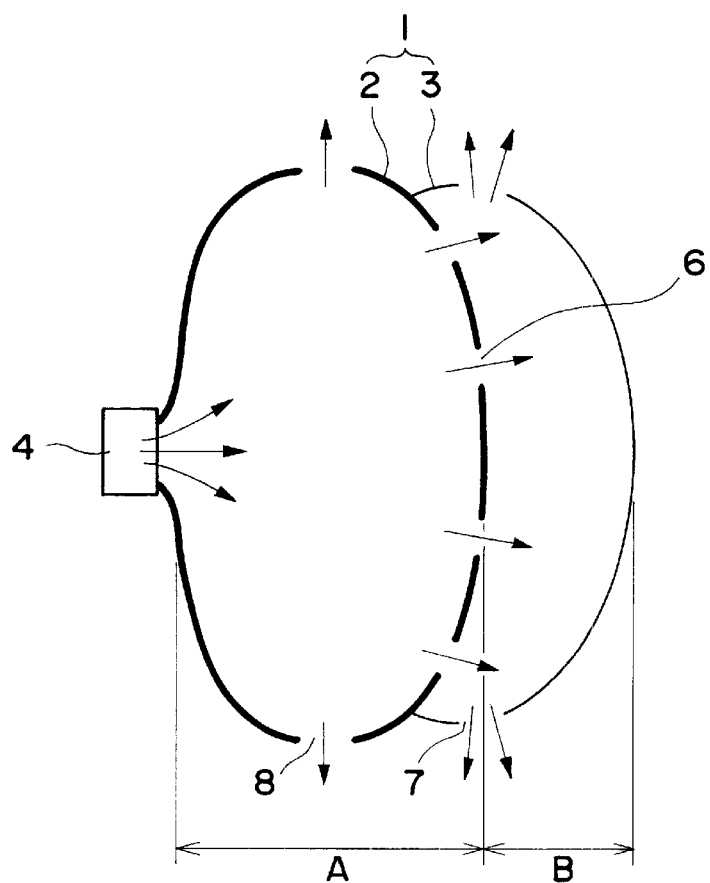
FIG. 3 is a sectional view of the air bag system when inflating and deploying.
Figure 4:
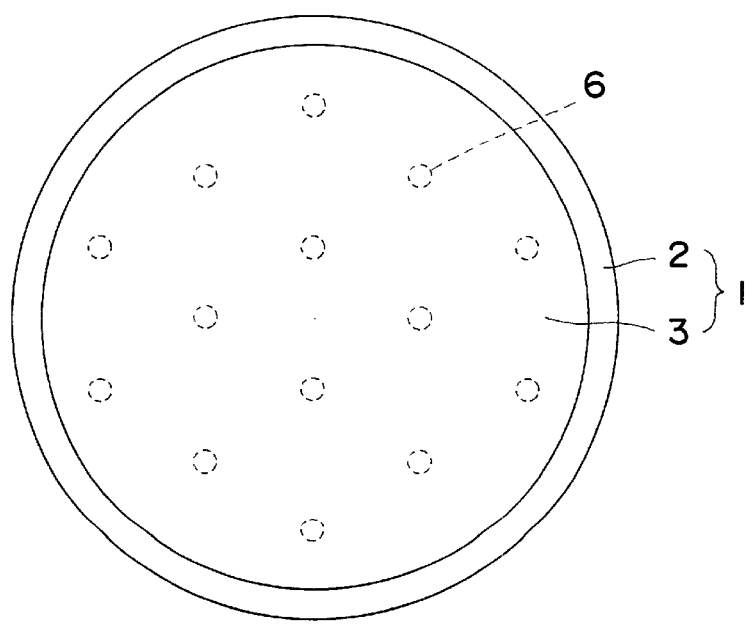
FIG. 4 is a front view of the air bag system when inflating and deploying.

A preferred embodiment of the present invention will be explained below referring to FIGS. 1 to 4.

An air bag system of an embodiment of the present invention comprises an air bag body 1 mainly made of nylon which consists of a primary air bag 2 and a secondary air bag 3, said secondary air bag 3 being adhered to the front surface of the primary air bag 2 or on the side facing an occupant who is to be protected by the air bag system, an inflator 4 which is a gas ejector for introducing a high-pressure gas to inflate and deploy the air bag body 1 at the time of collision, and an outer sensor switch (not shown) which is mounted on a bumper or the like of an automobile for detecting a collision. The air bag body 1 along with the inflator 4 is housed within a center pad 5a of a steering wheel 5. When the inflator 4 is actuated, a high-pressure gas is first introduced into the primary air bag 2 to inflate and deploy the primary air bag 2 and then fed into the secondary air bag 3 through the primary air bag 2.

On the front surface of the primary air bag 2, gas introducing ports 6 for introducing the high-pressure gas into the secondary air bag 3 are provided. In this embodiment, the gas introducing ports 6 are 14 round-shape holes each having a diameter of 10 mm. The high-pressure gas introduced into the secondary air bag 3 is limited by the gas introducing ports 6. Thus, the dimension and number of the gas introducing ports 6 define the flow rate of the gas introduced into the secondary air bag 3 and decide the inflating and deploying velocity of the secondary air bag 3. In other words, the lower flow rate of the gas passing through the gas introducing ports 6 relieves shock to the face by the inflating and deploying air bag body 1.

In the air bag system of this embodiment, the proportion of thickness A of the primary air bag 2 and thickness B of the secondary air bag 3 when inflating and deploying is determined as 2:1, and the flow rate of the high-pressure gas introduced from the inflator 4 into the primary air bag 2 is more than twice as large as the flow rate of the high-pressure gas introduced from the primary air bag 2 into the secondary air bag 3 because a part of the high-pressure gas is exhausted through vent holes 8 which will be described later. Accordingly, the time until completion of inflation and deployment is the same in the primary air bag 2 and in the secondary air bag 3, thereby absorbing shock or impact to the face as well as primary impact by collision.

The secondary air bag 3 is provided with vent holes 7 for exhausting the high-pressure gas when the secondary bag 3 inflates and deploys. In this embodiment, the vent holes 7 are 6 round-shape holes each having a diameter of 20 mm. As described below, most of the primary impact is absorbed by the primary air bag 2, and the secondary air bag 3 only needs to absorb 10–30% of the primary impact. Thus, by discharging most of the high-pressure gas introduced into the secondary air bag 3 to the outside, shock to the face is lessened.

On an outer periphery of the primary air bag 2, vent holes 8 which have a smaller diameter than the vent holes 7 of the secondary air bag 3 are provided. After the primary air bag 2 inflated and deployed, the high-pressure gas in the primary air bag 2 is exhausted through the vent holes 8, thereby deflating the primary air bag 2 as well as the secondary air bag 3 to absorb a primary impact and to secure a view of an occupant 10. The vent holes 8 having a smaller diameter than the vent holes 7 are preferably as small as possible because the primary air bag 2 is aimed to absorb a primary impact by collision.

According to the above-described air bag system, the occupant 10 is protected by inflating and deploying the air bag body 1 as explained below. FIG. 5 illustrates a process of absorbing an impact according to the embodiment of the present invention wherein FIG. 5A shows the air bag system when inflating and deploying immediately after an occupant collides with the secondary air bag, and FIG. 5B shows the air bag system when absorbing a primary impact.

When a moving automobile collides, the outer sensor switch which is mounted on a bumper or the like detects the collision and actuates the inflator 4. The actuated inflator 4 instantaneously ejects a high-pressure gas, and the gas is very quickly introduced into the primary air bag 2. Simultaneously, the high-pressure gas limited by a plurality of the gas introducing ports 6 which are provided on the front surface of the primary air bag 2 is introduced into the secondary air bag 3. As a result, the air bag body 1 consisting of the primary air bag 2 and the secondary air bag 3 which were housed in the center pad 5a of the steering wheel 5 inflates and deploys toward the face of the occupant 10 who is sitting on a seat 9 of the vehicle.

Figure 5A:
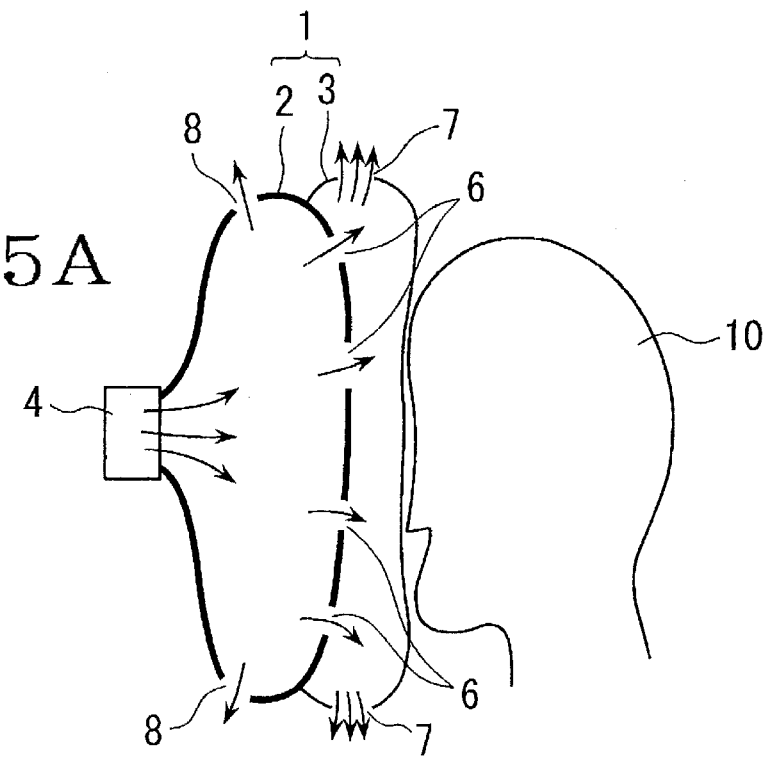
FIG. 5A shows the air bag system when inflating and deploying immediately after an occupant collides with the secondary air bag.

During the above operation, as shown in FIG. 5A, since the secondary air bag 3 which slowly inflates and deploys first touches the face of the occupant 10, shock or impact to the face of the occupant 10 is slight. The high-pressure gas introduced into the secondary air bag 3 is exhausted outside mainly through the vent holes 7 provided on the secondary air bag 3. Therefore, the amount of the gas exhausted from the vent holes 7 of the secondary air bag 3 is larger than the gas exhausted from the vent holes 8 of the primary air bag 2 which are smaller than the vent holes 7, which makes the pressure of the gas in the secondary air bag 3 less than the pressure of the gas which inflates and deploys the primary air bag 2. Therefore, acceleration in an aperiodic motion of the secondary air bag 3 is less than that of the primary air bag 2, and the pressure initially imposed on the face of the occupant 10 is less when the secondary air bag 3 touches the face of the occupant 10.

Figure 5B:
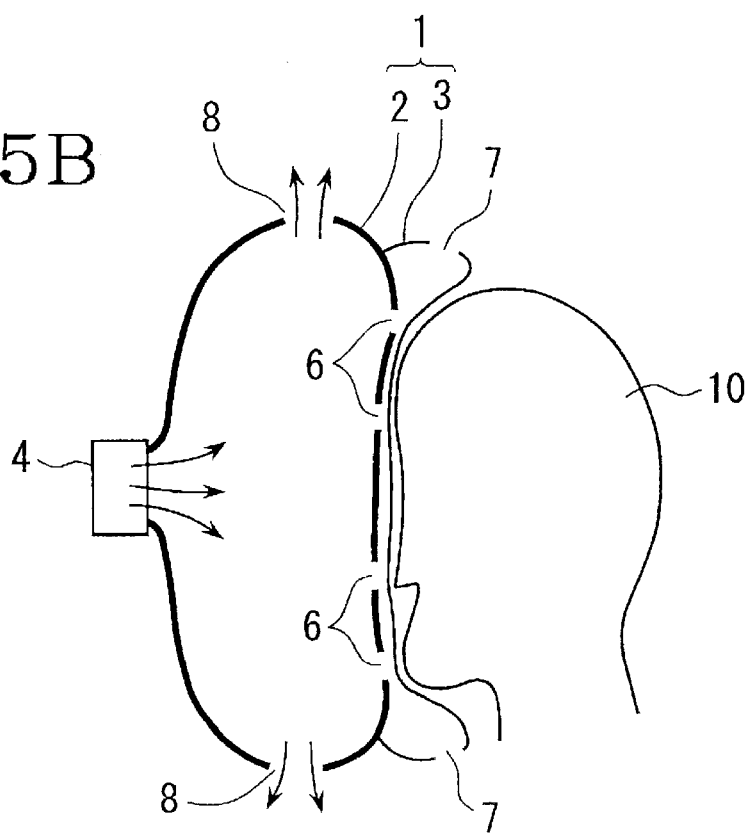
FIG. 5B shows the air bag system when absorbing a primary impact.

Next, as shown in FIG. 5B, shock to the occupant 10 at the time of collision is absorbed by the primary air bag 2 which has already inflated and deployed. Subsequently, the high-pressure gas which has inflated and deployed the primary air bag 2 is exhausted outside through the vent holes 8 provided on the outer periphery of the primary air bag 2, thereby deflating the primary air bag 2 as well as the secondary air bag 3. Thus, the primary impact is absorbed, and a view of the occupant 10 after the collision is secured so as to prevent additional accidents such as a secondary collision.

In particular, according to the air bag system of the present invention, as shown in FIG. 5B, if the occupant 10 who collided with the secondary air bag 3 crushes the secondary air bag 3 to block the gas introducing ports 6, the high-pressure gas in the primary air bag 2 is exhausted from the vent holes 8. Therefore, the primary air bag 2 gradually absorbs the impact by the occupant 10 by discharging the gas from the vent holes 8. Accordingly, compared with the conventional air bag systems disclosed in Unexamined Japanese Patent Publication No. H3-281460 and U.S. Pat. No. 5,927,748, shock to the face of the occupant 10 is less even when a passage connecting the double-layered bag is blocked.

In addition, when the occupant 10 who collided with the secondary air bag 3 reaches the primary air bag 2 without blocking the gas introducing ports 6, the pressure imposed by the occupant 10 on the primary air bag 2 is directly discharged to the outside through the vent holes 8. Therefore, the pressure in the primary air bag 2 does not rise to exert any impact on the occupant 10.

By forming the secondary air bag 3 with a urethane foam material which is softer than the material of the primary air bag 2, the softness of the material of the secondary air bag 3 further absorbs the impact when the secondary air bag inflates and deploys while the primary air bag 2 made of a standard material maintains the ability to absorb a primary impact, thereby lessening shock to the face of the occupant 10.

Furthermore, a material of the secondary air bag 3 which is thinner than the primary air bag 2, specifically, 20% as thick as the primary air bag 2, the softness of the secondary air bag 3 due to the thin material can absorb impact when the secondary air bag 3 inflates and deploys while the primary air bag 2 having a standard thickness maintains the ability to absorb a primary impact.

Although the above-described embodiment referring to the drawings shows the air bag body 1 housed in the steering wheel 5 of a driver's sheet, the air bag body 1 of the present invention may be mounted in doors beside a driver and other occupants, a dashboard in front of an occupant, rear sides of front seats, etc.

While particular embodiment of the present invention has been shown and described, numerous variations and alternate embodiments will occur to those skilled in the art. Accordingly, it is intended that the invention be limited only by the appended claims.

What is claimed is:

1. An air bag system, comprising:

a primary air bag and a secondary air bag, said primary air bag being inflatable and deployable by a high-pressure gas; and said secondary air bag being disposed on a side of the primary air bag facing an occupant, said secondary air bag being inflatable and deployable by the high-pressure gas which is introduced into the secondary air bag through said primary air bag, each of said primary air bag and said secondary air bag having at least one vent hole through which the high-pressure gas used to inflate and deploy the primary air bag and the secondary air bag is exhausted, an amount of the high-pressure gas exhausted from said at least one vent hole in the secondary air bag being larger than another amount of the high-pressure gas exhausted from said at least one vent hole in the primary air bag.

2. The air bag system according to claim 1, wherein said secondary air bag is adhered to said primary air bag, and at least one gas introducing port for introducing the high-pressure gas into the secondary air bag on the side facing the occupant of said primary air bag.

3. The air bag system according to claim 2, wherein said secondary air bag is made of a softer material than a material of said primary air bag.

4. The air bag system according to claim 2, wherein said secondary air bag is made of a thinner material than a material of said primary air bag.

5. The air bag system according to claim 1, wherein said secondary air bag is made of a softer material than a material of said primary air bag.

6. The air bag system according to claim 1, wherein said secondary air bag is made of a thinner material than a material of said primary air bag.

* * * * *